United States Patent [19]

Roettgen

[11] 4,366,837

[45] Jan. 4, 1983

[54] EARLY WARNING BYPASS VALVE ASSEMBLY

[75] Inventor: Leslie A. Roettgen, Columbus, Ind.

[73] Assignee: Cummins Engine Company, Inc., Columbus, Ind.

[21] Appl. No.: 214,673

[22] Filed: Dec. 9, 1980

[51] Int. Cl.³ .............................................. F16K 37/00
[52] U.S. Cl. .................................. 137/557; 137/508; 137/540; 210/90; 210/130; 116/268; 340/607; 340/626
[58] Field of Search ................... 137/508, 540, 543.21, 137/554, 557, 512.2; 210/90, 130; 116/268; 340/607, 611, 614, 626

[56] References Cited

U.S. PATENT DOCUMENTS

| | | | |
|---|---|---|---|
| 2,810,034 | 10/1957 | Grant | 200/81.9 |
| 2,879,892 | 3/1959 | Frakes | 210/90 |
| 3,127,586 | 3/1964 | Heyn et al. | 340/60 |
| 3,295,507 | 1/1967 | Carter et al. | 123/196 |
| 3,644,915 | 2/1972 | McBurnett | 340/239 F |
| 3,790,931 | 2/1974 | Leveraus | 340/60 |
| 3,794,168 | 2/1974 | Perkins | 210/130 |
| 4,142,973 | 3/1979 | Kachman | 340/607 |

FOREIGN PATENT DOCUMENTS 1081443 8/1967 United Kingdom.
1097773 1/1968 United Kingdom.
1119032 7/1968 United Kingdom.
1189492 4/1970 United Kingdom.

*Primary Examiner*—Alan Cohan
*Assistant Examiner*—John A. Rivell
*Attorney, Agent, or Firm*—Sixbey, Friedman & Leedom

[57] ABSTRACT

A "snap action" early warning bypass valve assembly (2) responsive to fluid pressure differentials functions as both an electrical switch to provide an indication at impending fluid bypass and as a mechanical valve to actually implement the fluid bypass. The valve assembly includes a piston (24) supported by a retaining surface (18,106) having a central bore (22,110) formed therein. The piston (24) contains a bypass aperture (36) and is shaped to present a differential sealing area (39) to fluid circulating within the central bore (22,110). A spring-biased bypass disc (42) covers the bypass aperture (36) to present a central sealing area (45) to fluid within the central bore (22,110). A first pressure differential acting simultaneously across the central (45) and differential (39) sealing areas forces piston (24) into contact with an electrical terminal pin (48,92), thus energizing an alarm circuit (48-64,90). A second, greater pressure differential acting across the central sealing area (45) alone pushes the bypass disc (42) away from the bypass aperture (36) to complete the bypass operation.

17 Claims, 6 Drawing Figures

EARLY WARNING BYPASS VALVE ASSEMBLY

DESCRIPTION

1. Technical Field

This invention relates to the field of fluid bypass valves and more particularly to a valve assembly which provides an indication of an impending bypass condition prior to the initiation of the fluid bypass operation.

2. Background Art

Fluid treatment elements such as fuel filters, oil filters or oil coolers in a fluid distribution system are vulnerable to many types of potentially damaging malfunctions. For example, plugged or clogged fluid treatment elements usually cause blockage of fluid flow through the distribution system, and if left unattended this fluid flow blockage can have dire consequences, even leading to catastrophic failure of the kind which results when a clogged oil filter prevents the passage of lubricating fluid to critical parts of an internal combustion engine. Rupture or destruction of a fluid treatment element can also occur, due to excessive fluid flow surges in the supply system, giving rise to circulation of untreated fluid to various operating points around the system. In order to overcome the deleterious effects associated with obstructed, ruptured or otherwise degenerate fluid treatment elements, various warning and/or bypass devices have heretofore been proposed. U.S. Pat. No. 2,810,034 issued to Grant on Oct. 15, 1957 and U.S. Pat. No. 3,127,586 issued to Heyn et al on Mar. 31, 1964 both disclose devices which generate warning signals when oil flow through an oil filter is reduced due to plugging. U.S. Pat. No. 2,879,892 issued to Frakes on Mar. 31, 1959; U.S. Pat. No. 3,295,507 issued to Carter et al on Jan. 3, 1967; U.S. Pat. No. 3,644,915 issued to McBurnett on Feb. 22, 1972 and U.S. Pat. No. 3,790,931 issued to Leveraus on Feb. 5, 1974, all disclose filter bypass mechanisms wherein fluid is automatically rerouted around a filtering element in response to the clogging of the element while an alarm device indicates that the filter bypass operation has occurred. Despite the protection furnished by the aforementioned devices, however, many limitations in the structure and functioning of prior art bypass valves and warning circuits remain. In arrangements of the type illustrated in Frakes and Carter, the bypass valve itself is separate from the bypass warning circuit, and hence neither arrangement takes advantage of the economies of size and cost which could be obtained from constructing the bypass valve/warning circuit as a unitary or integral assembly. Leverause and McBurnett, on the other hand, do combine the various elements of a bypass valve and a warning circuit, but fail to appreciate the desirability of activating the warning system before the bypass valve opens and permits impure or contaminated fluid to reenter the fluid distribution system downstream from the filter. As a net result, the prior art does not adequately address the need for a fluid bypass valve and warning device which is simple to manufacture yet provides effective early warning and subsequent reliable protection against both clogging and flow surges in fluid distribution systems.

DISCLOSURE OF THE INVENTION

It is therefore an object of the present invention to provide an early warning bypass valve assembly which is capable of bypassing fluid around an obstruction in a fluid distribution system.

It is an additional object of the present invention to provide an early warning bypass valve assembly which functions to bypass fluid around an obstruction in a fluid distribution system while also providing an alarm signal indicative of the bypass operation.

It is yet an additional object of the present invention to provide an early warning bypass valve assembly including a valve mechanism and a warning circuit wherein the valve mechanism functions both as a fluid valve for initiating a fluid bypass operation and as an electrical switch for energizing a warning circuit.

It is still an additional object of the present invention to provide an early warning bypass valve assembly including a valve mechanism which functions both as a fluid valve for initiating a fluid bypass operation and as an electrical switch for energizing a warning circuit such that the warning circuit energization occurs prior to the fluid bypass operation.

It is another object of the present invention to provide an early warning bypass valve assembly which responds to a first fluid pressure differential across the valve assembly by energizing a warning circuit to indicate impending fluid bypass operation and which responds to a second, greater fluid pressure differential across the valve assembly to actually implement the fluid bypass operation while continuing to energize the warning circuit.

It is also an object of the present invention to provide an early warning bypass valve assembly which responds to potentially damaging fluid flow surges upstream of the fluid treatment system by energizing a warning circuit to indicate the presence of the flow surges while protecting the treatment elements from rupture.

These and other objects of the present invention are achieved in an early warning bypass valve assembly which employs a sealing piston slidably mounted inside a cavity formed at the intersection of inlet, outlet and bypass conduits. The sealing piston includes a central bore having a grommet or the like disposed therein to form a bypass aperture, and a bypass disc covers the grommet. A retaining seat also having a central bore is fitted around the interior surface of the cavity at a location between the bypass conduit and the inlet and outlet conduits, and a spring contacts the bypass disc to bias the bypass disc and sealing piston into fluid-tight contact with the retaining seat. Under normal fluid flow conditions the pressure differential acting across the sealing piston is insufficient to overcome the spring bias, and the bypass disc, sealing piston and retaining seat maintain their fluid-tight relationship to prevent any fluid flow between the inlet and bypass conduits. Periodic flow surges or blockage of the fluid flow downstream from the outlet conduit, however, causes the fluid pressure in the inlet conduit to increase relative to the residual pressure of any fluid present in the bypass conduit. When this pressure differential reaches a first predetermined level, the force exerted by the pressurized fluid against the sealing piston is sufficient to push the sealing piston away from the retaining seat with a "snap-action" effect, while the bypass disc remains in place over the grommet. The sealing piston continues to slide along the interior of the cavity until contacting a terminal pin which projects into the cavity interior, whereupon an electrical circuit through the terminal pin is completed and an alarm device is energized. If the obstruction or surge in the flow path does not subside, the pressure differential acting across the sealing piston continues to build until a second predetermined level is reached, at which point the force exerted by the pressurized fluid overcomes the spring bias (increased somewhat by piston/disc movement and spring compression) and pushes the bypass disc away from the grommet. Fluid then passes through the sealing piston and on into the bypass conduit to complete the fluid bypass operation.

BRIEF DESCRIPTION OF THE DRAWINGS

The various features, objects and advantages of the present invention will become more apparent from the following Brief Description of the Drawings, wherein.

BEST MODE FOR CARRYING OUT THE INVENTION

Figure 1:
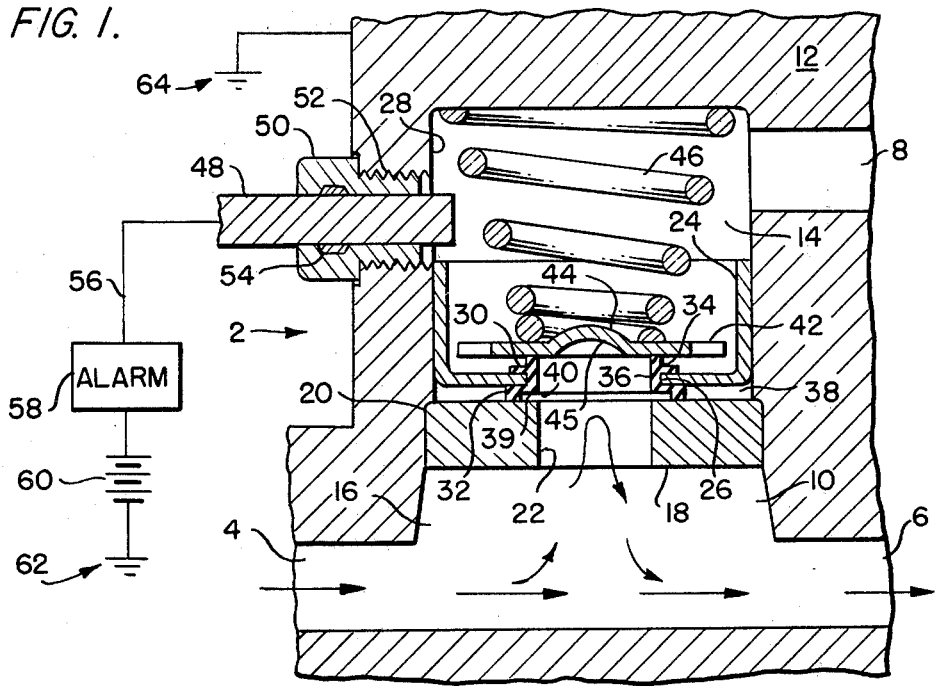
FIG. 1 is a cross-sectional view of the early warning bypass valve assembly of the present invention, showing the relative position of the valve elements during normal fluid flow conditions.

The early warning bypass valve assembly of the present invention, indicated generally at 2 in FIG. 1, is positioned in a fluid distribution system at the three-way intersection of fluid inlet, outlet, and bypass conduits 4, 6, 8. A cylindrical cavity 10 formed in supporting material 12 surrounding the conduits serves to receive the assembly. Supporting material 12 is fabricated from a suitably durable, electrically-conductive material. Cavity 10 is divided into upper and lower chambers 14, 16 such that the diameter of lower chamber 16 is greater than the diameter of upper chamber 14. An annular retaining seat 18 is fitted between upper and lower chambers 14, 16 and is secured in fluid-tight fashion to the circumferential lip 20 formed as a result of the difference in diameters between the upper and lower chambers. A circular bore 22 at the center of retaining seat 18 provides for the passage of fluid therethrough. A cup-shaped sealing piston 24 having a circular central bore 26 axially aligned with bore 22 is slidably mounted within upper chamber 14. Sealing piston 24, which is constructed from or plated with an electrically-conductive material, has an outer diameter approximately equal to the diameter of upper chamber 14. Thus, the sealing piston electrically contacts the inner surface 28 of cavity 10 in essentially fluid-tight fashion while retaining the capacity for longitudinal movement inside the upper chamber. A sealing ridge is positioned around the lower periphery of central bore 26 to support piston 24 on retaining seat 18 and to furnish a differential sealing area between the piston and the retaining seat as described in greater detail hereinbelow. In the preferred embodiment of the present invention, the sealing ridge is provided by a structure such as grommet 30, but other structures containing ridges would be equally suitable. Grommet 30 includes a lower lip 32 and an upper lip 34 disposed within central bore 26 to form a bypass aperture 36 in the sealing piston 24. It can be seen in FIG. 1 that the outer diameter of lower lip 32 terminates at a predetermined distance from inner surface 28 to define an annular cavity 38 between the sealing piston and retaining seat 18. It can also be seen in FIG. 1 that the inner diameter of lower lip 32 is larger than the diameters of both bypass aperture 36 and bore 22, thereby creating a lower surface 39. Lower surface 39 is spaced from retaining seat 18 to define a second annular cavity 40. A lobed bypass disc 42 having a center section 44 with a lower surface 45 rests on the upper lip 34 of grommet 30 to completely cover bypass aperture 36. The bypass disc 42, the grommet 30 including upper and lower lips 34, 32 and the sealing piston 24 are all urged or biased together in fluid-tight relationship against the retaining seat 18 by the action of a spring 46 disposed within upper chamber 14. In this manner, lower surface 45 of bypass disc 42 presents a central sealing area to fluid within the circular bore 22 of retaining seat 18, lower surface 39 of grommet 30 presents an additional or differential sealing area to fluid within the circular bore 22, and lower surface 45 together with lower surface 39 present a total sealing area to fluid within the circular bore.

The warning circuit of the present invention includes an electrically-conductive terminal pin 48 which is embedded in an electrically nonconductive bolt 50 and inserted through a threaded opening 52 in supporting material 12 such that one end of terminal pin 48 projects into the interior of upper chamber 14 above sealing piston 24. If desired, a retaining clip 54 may be inserted in bolt 50 to further secure terminal pin 48 against movement and to prevent fluid leakage from cavity 10. An electrical lead 56 connects terminal pin 48 to an alarm device 58. Alarm device 58 is in turn connected to the positive terminal of a power source 60. The alarm device may consist of a light, bell, buzzer or the like, which as explained more fully hereinbelow is energized by battery 60 in response to the completion of a circuit through the alarm device. The ground terminal of power source 60 is grounded as indicated at 62, while electrically-conductive supporting material 12 is grounded as indiat 64.

The operation of early warning bypass valve assembly 2 is explained in detail in connection with FIGS. 1, 2 and 3. Referring again to FIG. 1, inlet conduit 4 is connected to a source of pressurized fluid such as a pump or compressor (not shown) and outlet conduit 6 is connected to a fluid treatment element such as a fuel or lubricant filter (not shown). Bypass conduit 8 is connected to a fluid network (not shown) which completely bypasses the fluid treatment element. The biasing force of spring 46 urges sealing piston 24 away from terminal pin 48 to prevent any mechanical or electrical contact between the terminal pin and the sealing piston. The center section 44 of bypass disc 42 is likewise urged by spring 46 into sealing arrangement with the upper lip 34 of grommet 30 as previously mentioned to prevent any flow of fluid from lower chamber 16 through the bypass aperture 36 in sealing piston 24 to the upper chamber 14 of cavity 10. Accordingly, a fluid flow path between inlet conduit 4 and outlet conduit 6 is established as indicated by the arrows in FIG. 1 and the electrical circuit through alarm device 58 is opened at terminal pin 48.

During normal flow conditions the differential in pressure between fluid circulating within the lower chamber 16 of cavity 10 and any residual fluid present in bypass conduit 8 is insufficient to overcome the force of spring 46. Bypass disc 42 and sealing piston 24 thus remain firmly in place to block any fluid flow from inlet conduit 4 to bypass conduit 8. If some obstruction or surge in the fluid flow path downstream from outlet conduit 6 should occur, the pressure of the fluid circulating in lower chamber 16 of cavity 10 will increase relative to the residual pressure in bypass conduit 8, and hence the pressure differential across valve assembly 2 will increase. When this pressure differential reaches a first predetermined level, the force exerted by the fluid against the total sealing area of both lower surface 39 and lower surface 45 will begin to overcome the residual pressure in bypass conduit 8 and the bias exerted by spring 46. Sealing piston 24 will begin to move away from retaining seat 18, whereupon fluid will flow past the lower lip 32 of grommet 30 into cavity 38. The resulting increase in contact area between the pressurized fluid from lower chamber 16 and the sealing piston 24 creates an additional force which opposes the bias of spring 46. This additional force produces a "snap-action" effect, pushing sealing piston 24 rapidly along the inner surface 28 of upper chamber 14 and into abutment with the projecting terminal pin 48. The point of abutment, indicated at 66 in FIG. 2, serves to arrest the movement of sealing piston 24 while simultaneously skewing the sealing piston with respect to the inner surface 28, thus insuring electrical contact between the supporting structure 12, the sealing piston and the terminal pin. An electrical circuit from ground 62 through power source 60, alarm device 58, lead 56, terminal pin 48, sealing piston 24, and supporting structure 12 to ground 64 is thereafter completed, and the alarm device is energized to furnish a visual or audible indication of the downstream obstruction or surge. Due to the additional force supplied by the fluid circulating in cavity 38, early warning bypass valve assembly 2 is relatively unaffected by fluid pressure fluctuations which might otherwise cause spring 46 to push sealing piston 24 back out of contact with terminal pin 48. Consequently, the operation of the early warning bypass valve is stabilized and alarm device 58 remains energized until the downstream obstruction or fluid surge is actually removed.

Figure 2:
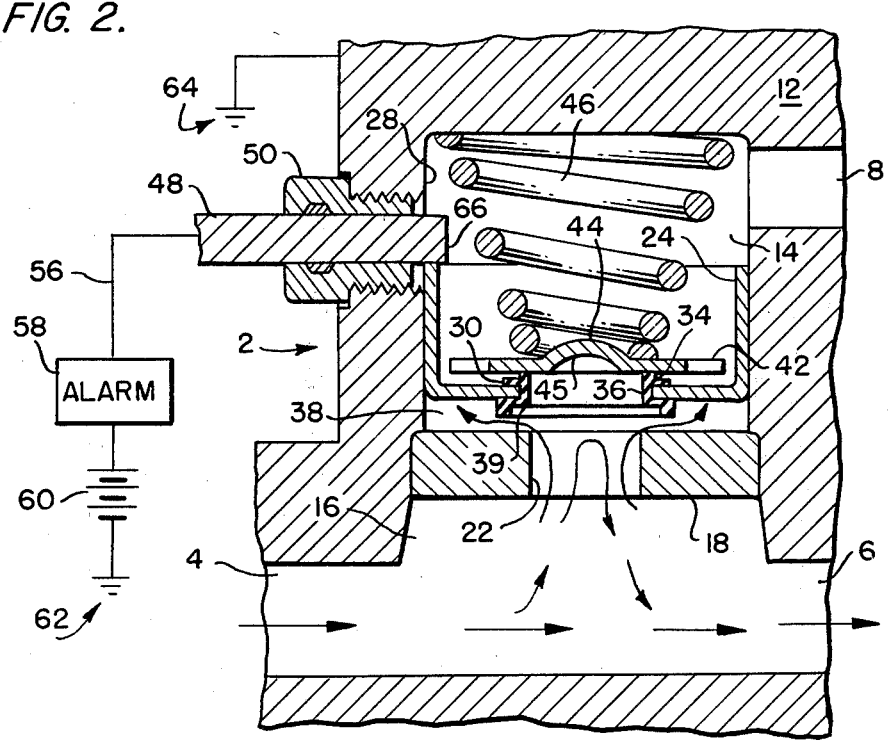
FIG. 2 is a cross-sectional view of the early warning bypass valve assembly of the present invention showing the relative position of the valve elements when the fluid pressure differential across the valve assembly has reached the first predetermined level and the alarm device has been activated to warn of impending fluid bypass operation.

Although early warning bypass valve assembly 2 responds to an increase in fluid pressure differential by energizing alarm device 58, it can be seen upon further examination of FIG. 2 that fluid communication between inlet conduit 4 and bypass conduit 8 continues to be blocked as long as the fluid pressure differential does not rise beyond the aforementioned first predetermined level. This action of the bypass valve results from the fact that the force initially opposing the bias of spring 46 and the residual pressure in bypass conduit 8 when valve assembly 2 is in the closed position consists of two components. The first component is generated by fluid present within the sealed-off bypass aperture 36 and in contact with the central sealing area provided by the lower surface 45 of bypass disc center section 44. The second force component is generated by fluid in contact with the differential sealing area provided by the lower surface 39 of grommet 30. When the fluid pressure differential reaches the first predetermined level, the two force components additively combine across the total sealing area comprised of lower surface 45 and lower surface 39 to push sealing piston 24 away from retaining seat 18 as described above. The first force component taken alone, however, is insufficient to overcome the spring bias at the first predetermined level, and bypass disc 42 remains in sealing contact with upper lip 34 of grommet 30 during the initial movement of sealing piston 24 into contact with terminal pin 48. When the sealing piston moves to contact the terminal pin, the attendant compression of spring 46 increases the biasing force exerted against bypass disc 42 to further enhance sealing contact between the bypass disc and upper lip 34.

Figure 3:
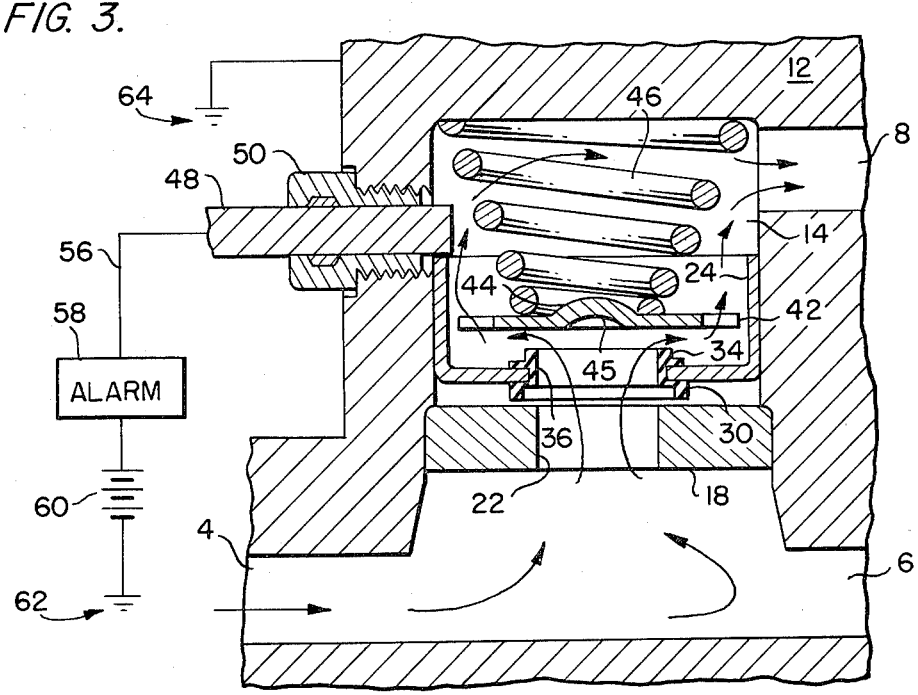
FIG. 3 is a cross-sectional view of the early warning bypass valve assembly of the present invention showing the relative position of the valve elements after the fluid pressure differential has reached the second predetermined level and the actual fluid bypass operation has been initiated.

Should the fluid pressure in the lower chamber 16 of cavity 10 continue to build beyond the first predetermined level, the valve action illustrated in FIG. 3 will occur. The force exerted by the fluid against lower surface 45 of center section 44 increases in response to the rise in fluid pressure until a second predetermined pressure differential greater than the first predetermined pressure differential is reached, whereupon the fluid force is sufficient to overcome the higher bias exerted aganst bypass disc 42 by spring 46. Center section 44 is pushed away from the upper lip 34 of grommet 30, permitting fluid to pass freely through bypass aperture 36 and around the lobes of bypass disc 42 into upper chamber 14, as indicated by the arrows in FIG. 3. The residual pressure in bypass conduit 8 offers less resistance to the fluid than the obstruction in outlet conduit 6, and fluid flow continues through upper chamber 14 on into bypass conduit 8 to complete the fluid bypass operation. It can also be seen in FIG. 3 that sealing piston 24 remains in contact with terminal pin 48, and alarm 58 remains energized. The point at which center section 44 uncovers bypass aperture 36 i.e., the value of the second predetermined pressure differential, can be adjusted by changing the size of spring 36 or area of surface defined by the upper sealing lip. In a similar fashion, the point at which sealing piston 24 and bypass disc 42 together uncover bore 22 in retaining seat 18, i.e., the value of the first predetermined pressure differential, may be adjusted by changing both the size of spring 46 and the area of lower surface 39 on grommet 30. The values of the first and second predetermined pressure differentials can also be modified if desired by changing the inner diameter of upper lip 34 on grommet 30 to provide additional sealing area between bypass disc 42 and bypass aperture 36. As long as the inner diameter of upper lip 34 is not made larger than the inner diameter of lower lip 32, alarm device 58 will always be energized prior to the initiation of the bypass valve operation.

Figure 4:
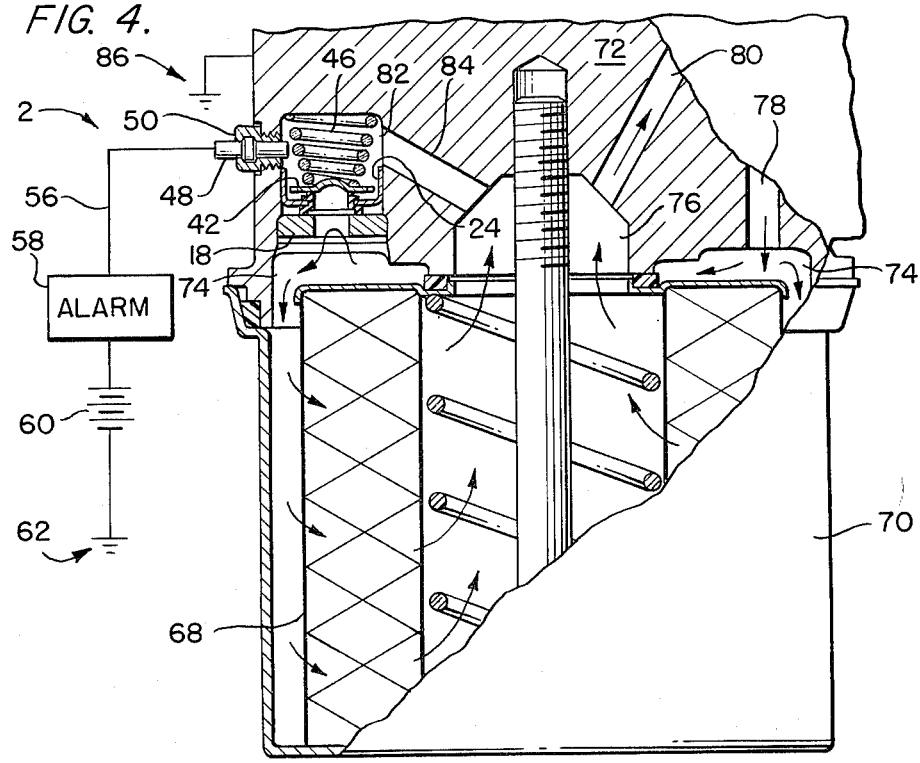
FIG. 4 is a partial cross-sectional view illustrating an early warning bypass valve assembly as installed in the oil filtering system of an internal combustion engine.

The early warning bypass valve assembly of the present invention is suitable for use in a wide variety of fluid distributing systems. For example, the valve can be installed in the lubrication circulating network of an internal combustion engine to provide a means for bypassing lubricating fluid around a clogged oil filter, thus insuring a constant supply of lubricant during engine operations. Such an application is illustrated in FIG. 4, wherein a filter element 68 mounted within a casing 70 is secured to a filter head 72. Filter head 72 is fabricated from an electrically-conductive material, and includes an annular oil receiving cavity 74 and an oil discharge cavity 76 respectively communicating with oil inlet and outlet conduits 78, 80. Filter head 72 also contains a filter bypass network consisting of an oil bypass cavity 82 extending from annular receiving cavity 74 and an oil bypass conduit 84 for conducting oil between oil bypass cavity 82 and discharge cavity 76. An early warning bypass valve assembly 2 of the type described in connection with FIGS. 1-3, including retaining seat 18, sealing piston 24, lobed bypass disc 42 and spring 46, is inserted in bypass cavity 82. Terminal pin 48 is mounted on the side of filter head 72 and projects into bypass cavity 82 at a point above sealing piston 24. As described previously, terminal pin 48 is electrically insulated from filter head 72 by an electrically nonconductive bolt 50. Grounded power source 60 and alarm device 58 are connected to terminal pin 48 as also described above, while filter head 72 is grounded as indicated at 86.

Oil enters filter casing 70 via oil inlet conduit 78 and annular receiving cavity 74 and circulates through filter element 68 before passing into discharge cavity 76. The filter element removes objectionable residues and impurities from the oil to provide a supply of clean oil for the discharge cavity. Oil is removed from the discharge cavity to lubrication points within the internal combustion engine via radially oriented oil outlet conduit 80. During normal operation the flow of oil through filter element 68 remains relatively unimpeded and the pressure differential between annular receiving cavity 74 and discharge cavity 76 is at a minimum. Hence, the pressure differential between annular receiving cavity 74 and bypass conduit 84 is at a minimum, and early warning bypass valve assembly 2 remains in the closed position of FIG. 1. If filter element 68 should become clogged or damaged, however, circulation through the filter element will be restricted and oil pressure at the upstream side of the filter element will begin to increase. This increase in oil pressure is in turn reflected throughout annular receiving cavity 74, and the pressure differential acting across early warning bypass valve assembly 2 will begin to increase as well. When the oil pressure differential reaches a first predetermined level, sealing piston 24 will snap into contact with terminal pin 48 as described in connection with FIG. 2, thereby energizing alarm device 58 and providing the engine operator with an indication of both filter failure and impending fluid bypass operation.

The "snap-action" of sealing piston 24 prevents the engine operator from deenergizing alarm circuit 58 by merely throttling back the engine speed. The temporary pressure fluctuation attributable to reduced engine RPM's will not be sufficient to enable spring 46 to overcome the greater fluid force exerted against sealing piston 24 once the sealing piston moves away from retaining seat 18. Thus, the engine operator must actually stop the engine and either replace or clean filter element 68 in order to deactivate alarm device 58. If engine operation is continued without removal of the clogged or damaged filter element, the oil pressure inside annular receiving cavity 74 continues to rise until the second predetermined pressure differential is reached, at which point the fluid bypass operation illustrated in FIG. 3 occurs. Oil is then rerouted around clogged filter element 68, passing instead through retaining seat 18, sealing piston 24 and bypass conduit 84 into discharge cavity 76. In this manner a constant bypass supply of lubricant to the engine is assured to prevent filter rupture or bearing starvation sufficient to cause catastrophic failure. Alarm device 58 remains energized as a remainder to the engine operator of the failure of the filtering element.

In addition to filter media deterioration, the lubrication system may also be subject to isolated transient, ambient, or maintenance conditions (outside of recommended practice) which can create excessive supply flow surges. These excessive flow levels, if not vented or relieved, can quickly rupture even a new filter; thus defeating its purpose thru the normal change interval. Flow surges of this magnitude will initiate both an alarm and bypass mode by design and alert the operator to the operational problem/technique which is not necessarily associated with filter deterioration.

Figure 5:
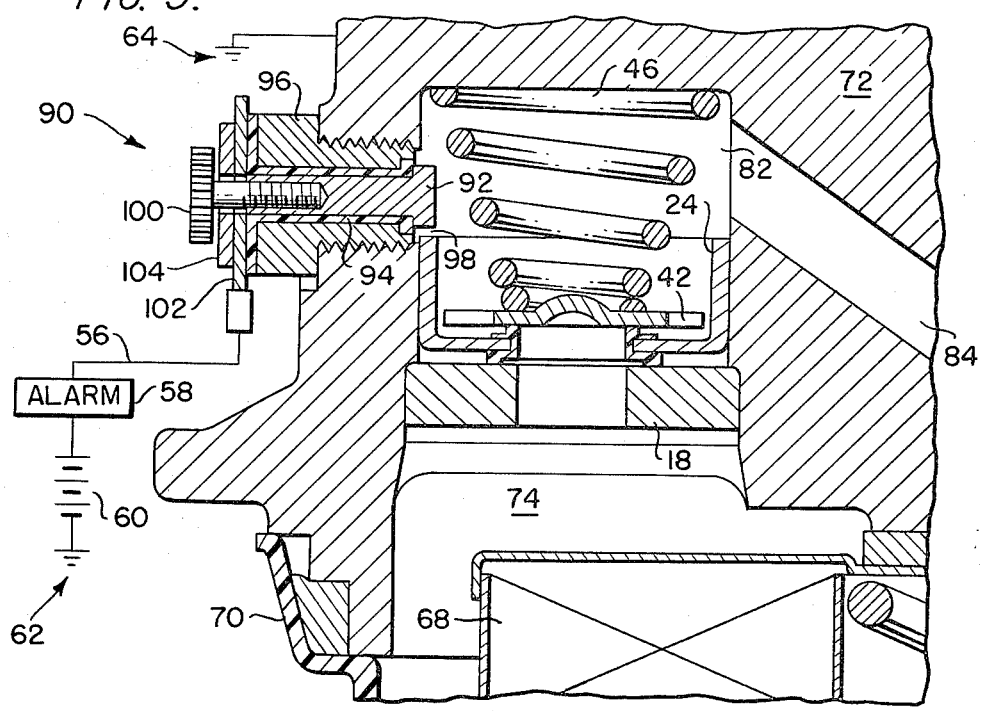
FIG. 5 is a cross-sectional view of another embodiment of the subject invention including T-shaped terminal pin.

An alternate embodiment of a warning circuit 90 for use with the early warning bypass valve assembly of the present invention is disclosed in FIG. 5. Warning circuit 90 is installed in a filter head 72 of the type shown in FIG. 4, but it should be noted that the circuit is not limited solely to oil filter bypass applications. The early warning bypass valve assembly of FIG. 5 again includes a retaining seat 18, a cup-shaped sealing piston 24, a lobed bypass disc 42 and a spring 46 disposed within a bypass cavity 82 and operable to conduct oil from an annular receiving cavity 74 to an oil bypass conduit 84 in response to the clogging of filter element 68. Terminal pin 48 of the FIGS. 1-4 embodiment, however, is replaced by a T-shaped terminal pin 92 which is coated with a layer of insulating material 94 such as silicon and embedded in a bolt structure 96. Bolt structure 96 is in turn threaded through a hole formed in filter head 72 to position terminal pin 92 in oil bypass cavity 82 such that a small clearance 98 is present between terminal pin 92 and sealing piston 24 when the sealing piston is seated against retaining seat 18. A screw or bolt arrangement 100 is employed to electrically secure a metallic lug 102 to terminal pin 92, and if desired a washer 104 may be inserted between bolt 100 and lug 102. Ground 64, ground 62, power source 60 and alarm device 58 are provided as in FIGS. 1-4. The construction of warning circuit 90 is completed by connecting electrical lead 56 from alarm device 58 to lug 102. The warning circuit, of course, is energized when sealing piston 24 is snapped into contact with terminal pin 92 in accordance with the teachings of FIG. 2.

Figure 6:
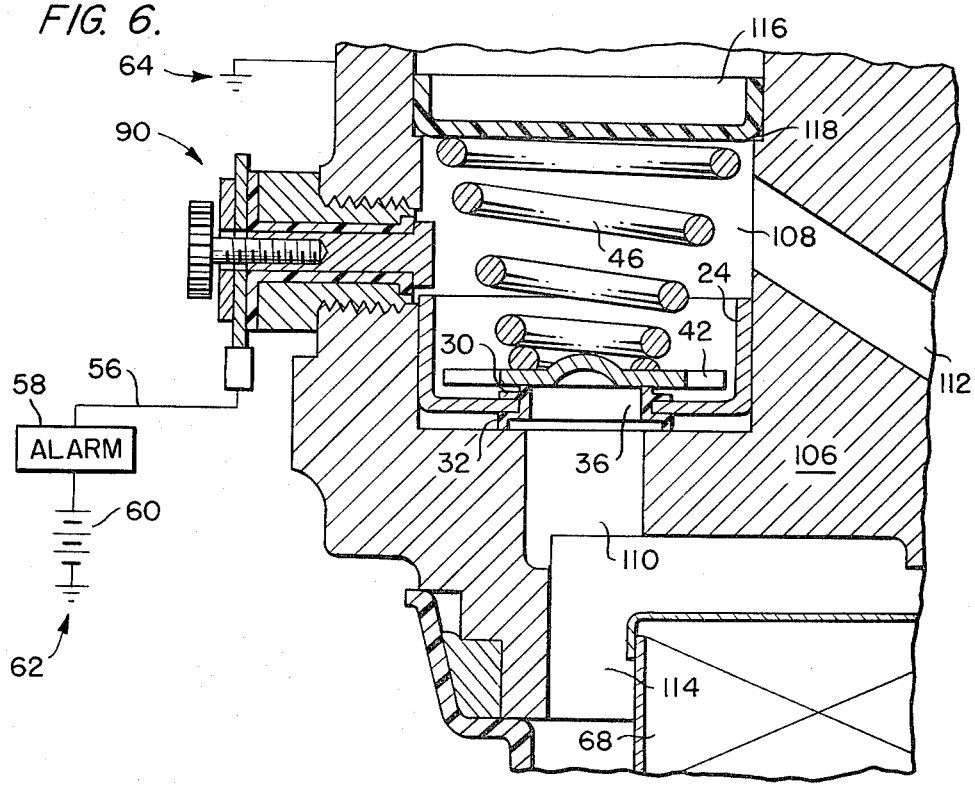
FIG. 6 is a cross-sectional view of yet another embodiment of the suject invention including a cup plug for sealing the oil bypass cavity.

Yet another embodiment of the present invention is shown in FIG. 6. In FIG. 6, the filter head of the FIG. 4 and 5 embodiments is modified to form a new filter head 106 having an oil bypass cavity 108 in fluid communication with both an intermediate oil inlet conduit 110 and an oil bypass conduit 112. Intermediate oil bypass conduit 110 connects oil bypass cavity 108 with an annular receiving cavity 114 such as annular receiving cavity 74 of FIGS. 4 and 5. Warning circuit 90, sealing piston 24 including grommet 30, lobed bypass disc 42 and spring 46 are all disposed within oil bypass cavity 108 as previously illustrated. Intermediate oil inlet conduit 110, however, is positioned directly beneath bypass aperture 36 in sealing piston 24 and has a diameter less than the inner diameter of lower lip 32 on grommet 30. Hence, sealing piston 24 seats directly against the structure of filter head 106, and the need for a retaining seat such as retaining seat 18 of FIGS. 1-5 is eliminated. A cup plug 116 fitted in a recess 118 formed at the top of oil bypass cavity 108 seals off the oil bypass cavity and provides a seating surface for spring 46. The exact position and configuration of cup plug 116 may be arranged to adjust the tension in spring 46 as desired. The early warning bypass valve assembly components of FIG. 6 function in the manner described hereinabove to provide early warning capability and fluid bypass operation, thus enhancing the reliability of the oil filtering operation in an internal combustion engine.

Only three embodiments of the present invention have been shown and described in the specification. It is nevertheless understood that various additional changes and modifications in the form and detail of the novel early warning bypass valves illustrated above may be made by those skilled in the art without departing from the scope and spirit of the invention. It is therefore the intention of the inventor to be limited only by the following claims.

I claim:

1. A valve apparatus for governing fluid flow between inlet and bypass conduits in fluid communication with a cavity formed in supporting material at the intersection of the inlet and bypass conduits and for completing an electrical circuit between an alarm device and an electrically-conductive portion of the supporting material, said valve apparatus including:
   (a) terminal means for providing an electrical path between the alarm device and the interior of the cavity;
   (b) piston means mounted within the cavity between the bypass conduit and the inlet conduit for movement between an off position in which said piston means is electrically isolated from said terminal means and an on position in which said piston means electrically contacts both said terminal means and the electrically conductive portion of the supporting structure to energize the alarm device, said piston means having a bypass aperture formed therein to provide for fluid communication between the inlet and bypass conduits;
   (c) disc means mounted within the cavity for movement between a closed position in which said disc means covers said bypass aperture in said piston means to prevent fluid communication between the inlet and bypass conduits and an open position in which fluid flows from the inlet conduit through said bypass aperture to the bypass conduit; and
   (d) biasing means for exerting a biasing force to urge said disc means toward said closed position and for simultaneously urging said piston means toward said off position such that a first predetermined fluid pressure differential between the inlet and bypass conduits will overcome said biasing force to move said piston means to said on position while a second, relatively greater predetermined fluid pressure differential between the inlet and bypass conduits will overcome said biasing force to move said disc means to said open position.

2. A valve apparatus as set forth in claim 1, wherein said piston means includes a lower surface in fluid communication with said inlet conduit and said disc means includes a lower surface also in fluid communication with said inlet conduit such that said first predetermined fluid pressure differential acts between said bypass conduit and both said lower surface of said piston means and said lower surface of said disc means to overcome said biasing force and move said piston means to said on position while said second predetermined fluid pressure differential acts between said bypass conduit and said lower surface of said disc means alone to overcome said biasing means and move said disc means to said open position.

3. A valve apparatus as set forth in claim 2, wherein said bypass aperture is formed in said lower surface of said piston means.

4. A valve apparatus as set forth in claim 3, including a retaining means positioned between said piston means and said inlet conduit, said retaining means having a supporting surface which contacts said piston means when said piston means is in said off position, said supporting surface including a bore for providing fluid communication between said bypass aperture and said inlet conduit.

5. A valve apparatus as set forth in claim 4, wherein said piston means includes a grommet disposed within said bypass aperture, said grommet having a lower lip which surrounds said bore in said supporting surface of said retaining means and rests in fluid-tight fashion against said supporting surface when said piston means is in said off position.

6. A valve apparatus as set forth in claim 5, wherein said bypass aperture is circular in shape and said lower lip of said grommet is also circular in shape, said lower lip having an inner diameter greater than the diameter of said bypass aperture such that the area between said bypass aperture and said inner diameter of said lower lip defines said lower surface of said piston means.

7. A valve apparatus as set forth in claim 6, wherein said bore in said supporting surface of said retaining means is also circular in shape and is axially aligned with said bypass aperture.

8. A valve apparatus as set forth in claim 7, wherein said grommet also includes an upper lip which contacts said disc means in fluid-tight fashion when said disc means is urged to said closed position.

9. A valve apparatus as set forth in claim 1, wherein said piston means is shaped to provide snap-action movement between said off position and said on position in response to said first predetermined fluid pressure differential.

10. A valve apparatus as set forth in claim 1, wherein said terminal means includes a pin structure which projects into said cavity and abuts said piston means when said piston means is in said on position.

11. A valve apparatus as set forth in claim 10, wherein said pin structure is constructed from an electrically-conductive material and said piston means is constructed from an electrically conductive material such that the point of abutment between said pin structure and said piston means in said on position provides for electrical contact between said pin structure and said piston means.

12. A valve apparatus as set forth in claim 11, wherein said piston means is cup-shaped such that the upper edge of said piston means moves into abutting contact with said pin structure when said piston means moves to said on position.

13. A valve apparatus as set forth in claim 1, wherein said disc means includes a plurality of lobes through which fluid flows when said disc means is in said open position.

14. A valve apparatus as set forth in claim 1, wherein said biasing means includes a spring which mechanically contacts said disc means.

15. A bypass valve apparatus for providing a warning indication of impending fluid bypass operation and for subsequently initiating the fluid bypass operation, said bypass valve apparatus comprising:

(a) a supporting structure having a cavity formed therein and fluid inlet and bypass conduits communicating with said cavity, said supporting structure also having at least one electrically-conductive portion with a first electrically-conductive contact surface exposed to the interior of said cavity;

(b) an electrical flow path connected to said electrically-conductive portion of said supporting structure;

(c) terminal means for providing a second electrically-conductive contact surface also exposed to the interior of said cavity but electrically insulated from said first electrically-conductive contact surface;

(d) alarm circuit means for providing a warning indication of impending fluid bypass operation, said alarm circuit means having one end thereof electrically connected to said electrical flow path and the other end thereof electrically connected to said terminal means;

(e) piston means mounted within said cavity between said bypass conduit and said inlet conduit for movement between an off position in which said piston means is electrically isolated from said terminal means and an on position in which said piston means electrically contacts both said second electrically-conductive contact surface of said terminal means and said first electrically-conductive contact surface of said supporting structure to energize said alarm circuit means, said piston means having a bypass aperture formed therein to provide for fluid communication between said inlet and bypass conduits;

(f) disc means mounted within said cavity for movement between a closed position in which said disc means covers said bypass aperture in said piston means to prevent fluid communication between said inlet and bypass conduits and an open position in which fluid flows from said inlet conduit through said bypass aperture to said bypass conduit; and (g) biasing means for exerting a biasing force to urge said disc means toward said closed position and for simultaneously urging said piston means toward said off position such that a first predetermined fluid pressure differential between said inlet and bypass conduits will overcome said biasing force to move said piston means to said on position while a second, relatively greater predetermined fluid pressure differential between said inlet and bypass conduits will overcome said biasing force to move said disc means to said open position.

16. A bypass valve apparatus as set forth in claim 15, wherein said biasing means includes a spring having a longitudinal axis aligned with the longitudinal axis of said cavity and said bypass conduit is radially oriented with respect to said longitudinal axes of both said spring and said cavity.

17. A method for providing a fluid distribution system with a warning indication of impending fluid bypass operation and for subsequently initiating the fluid bypass operation, said method comprising the steps of:

(a) interposing an apertured valve element between an inlet conduit and a bypass conduit to block flow around the valve element from the inlet conduit to the bypass conduit;

(b) exposing opposed surfaces of the valve element to the fluid pressures in the inlet conduit and the bypass conduit, respectively;

(c) biasing the valve element against the fluid pressure differential between the inlet conduit and the bypass conduit;

(d) moving the valve element against said biasing and into electrical contact with two electrically-conductive surfaces to complete an electrical circuit through an alarm device in response to a first predetermined fluid pressure differential;

(e) blocking the aperture contained in the valve element to prevent fluid flow through the aperture from the inlet conduit to the bypass conduit as long as the fluid pressure differential is below a second predetermined fluid pressure differential greater than said first predetermined fluid pressure differential; and (f) opening the aperture of the valve element to permit fluid flow therethrough between the inlet and bypass conduits when the fluid pressure differential exceeds the second predetermined fluid pressure differential.

* * * * *